United States Patent
Cox et al.

(10) Patent No.: US 10,118,691 B2
(45) Date of Patent: Nov. 6, 2018

(54) POWERED CLUTCH FOR AIRCRAFT WHEEL DRIVE SYSTEM

(71) Applicant: Borealis Technical Limited, North Plains, OR (US)

(72) Inventors: Isaiah W. Cox, London (GB); Joseph J. Cox, Portland, OR (US); Jonathan S. Edelson, Portland, OR (US); Yonatan Rotenberg, Miami, FL (US); John Hanson, Sussex, NJ (US)

(73) Assignee: Borealis Technical Limited, Gibraltar (GI)

( * ) Notice: Subject to any disclaimer, the term of this patent is extended or adjusted under 35 U.S.C. 154(b) by 47 days.

(21) Appl. No.: 15/216,911

(22) Filed: Jul. 22, 2016

(65) Prior Publication Data

US 2017/0021921 A1 Jan. 26, 2017

Related U.S. Application Data

(60) Provisional application No. 62/197,078, filed on Jul. 26, 2015.

(51) Int. Cl.
| | |
|---|---|
| *B64C 25/40* | (2006.01) |
| *F16D 11/14* | (2006.01) |
| *B60K 7/00* | (2006.01) |
| *F16D 28/00* | (2006.01) |

(52) U.S. Cl.
CPC .......... *B64C 25/405* (2013.01); *B60K 7/0007* (2013.01); *F16D 11/14* (2013.01); *F16D 28/00* (2013.01); *Y02T 50/823* (2013.01)

(58) Field of Classification Search
None
See application file for complete search history.

(56) References Cited

U.S. PATENT DOCUMENTS

| | | | |
|---|---|---|---|
| 2,408,163 A | * | 9/1946 | Fodor ..................... B64C 25/40 244/103 S |
| 3,075,623 A | | 1/1963 | Lund |
| 3,599,767 A | | 8/1971 | Soderquist |
| 6,290,044 B1 | | 9/2001 | Burgman et al. |
| 6,657,334 B1 | | 12/2003 | Edelson |
| 6,838,791 B2 | | 1/2005 | Edelson |

(Continued)

FOREIGN PATENT DOCUMENTS

FR 2998870 * 6/2014

*Primary Examiner* — Mark A Manley

(57) ABSTRACT

A powered clutch assembly is provided for an aircraft landing gear or other vehicle wheel drive system equipped with wheel drive motors controllable to move the aircraft or vehicle during ground travel. Electric power for the clutch assembly is transferred to clutch actuation elements by a rotary power transfer assembly mounted between stationary and rotating elements within the landing gear wheel drive system to clutch actuation elements. Actuation elements are powered to securely lock clutch rotating elements when required to improve the reliability of failsafe operation of the clutch assembly when torque should not be transferred and to unlock clutch rotating elements when torque should be transferred when the landing gear wheel drive system is used to drive the aircraft during ground travel. Power transferred from the rotary power transfer assembly may also be used to operate components associated with the aircraft drive wheel other than the powered clutch assembly.

14 Claims, 4 Drawing Sheets

(56) References Cited

U.S. PATENT DOCUMENTS

| | | | |
|---|---|---|---|
| 7,116,019 B2 | 10/2006 | Edelson | |
| 7,445,178 B2 | 11/2008 | McCoskey et al. | |
| 7,469,858 B2 | 12/2008 | Edelson | |
| 7,661,329 B2 | 2/2010 | Cali et al. | |
| 7,891,609 B2 | 2/2011 | Cox | |
| 7,975,960 B2 | 7/2011 | Cox | |
| 7,980,371 B2 | 7/2011 | Joki | |
| 8,042,670 B2 | 10/2011 | Bartos et al. | |
| 8,079,453 B2 | 12/2011 | Kimes | |
| 8,109,463 B2 | 2/2012 | Cox | |
| 8,684,300 B2 | 4/2014 | Wilson et al. | |
| 2009/0294577 A1 | 12/2009 | Roques et al. | |
| 2010/0065678 A1 | 5/2010 | Kiyosawa | |
| 2010/0252384 A1 | 10/2010 | Eisengruber | |
| 2010/0276535 A1* | 11/2010 | Charuel | B64C 25/405 244/50 |
| 2011/0233026 A1 | 9/2011 | Pawley | |
| 2012/0126053 A1* | 5/2012 | Christensen | B64C 25/405 244/50 |
| 2012/0138735 A1* | 6/2012 | Nierlich | B64C 25/405 244/50 |
| 2012/0168557 A1* | 7/2012 | Edelson | B64C 25/405 244/50 |
| 2012/0292437 A1* | 11/2012 | Garcia | B64C 25/405 244/58 |
| 2013/0277164 A1 | 10/2013 | Prout et al. | |
| 2015/0314862 A1* | 11/2015 | Blanc | B64C 25/405 244/103 S |
| 2017/0021921 A1* | 1/2017 | Cox | B64C 25/405 |

\* cited by examiner

POWERED CLUTCH FOR AIRCRAFT WHEEL DRIVE SYSTEM

PRIORITY CLAIM

This application claims priority from U.S. Provisional Patent Application No. 62/197,078, filed 26 Jul. 2015, the disclosure of which is fully incorporated herein by reference.

TECHNICAL FIELD

The present invention relates generally to clutch assemblies useful in vehicle wheel drive systems and specifically to a powered clutch assembly useful in an aircraft electric powered wheel drive system to drive aircraft independently of the aircraft's engines during ground operations.

BACKGROUND OF THE INVENTION

It has been proposed to power nose and/or main aircraft landing gear wheels with electric and other drive motors to drive aircraft autonomously or independently during ground travel and move aircraft without operating the aircraft main engines to provide thrust or using tow vehicles. The airline industry, moreover, is beginning to acknowledge that continuing to use an aircraft's main engines to move aircraft during ground operations is no longer the best option and is associated with safety issues, excess fuel use, and other challenges that may pose significant concerns for airlines. Improvements in aircraft ground travel that avoid reliance on aircraft main engines for motive power, including the use of landing gear wheel-mounted electric and other drive motors to power aircraft ground movement, continue to be sought. Control of the actuation of and transfer of the torque required to drive powered aircraft landing gear drive wheels, for example, must ensure that these drive wheels are driven only in a desired direction or only during selected times and conditions when an aircraft is driven autonomously during ground travel and that wheel drive systems are not engaged or operational at other times.

Many types of vehicle torque transferring clutch assemblies are known in the art. U.S. Pat. No. 3,075,623 to Lund; U.S. Pat. No. 3,599,767 to Soderquist; and U.S. Pat. No. 7,661,329 to Cali et al., for example, describe clutch assemblies incorporating sprag or pawl elements that may transmit torque between races or rotatable elements depending, in part, on their relative directions of rotation. One way vehicle clutches designed to lock in one direction and allow free rotation in the opposite direction are also available, as are improved selectable one way clutch designs, such as those described in U.S. Pat. No. 6,290,044 to Burgman et al.; U.S. Pat. No. 7,980,371 to Joki; and U.S. Pat. No. 8,042,670 to Bartos et al. Various other selectable clutch designs that provide controllable overrunning and coupling functions in automotive automatic transmissions, are described in U.S. Pat. No. 8,079,453 to Kimes and in U.S. Patent Application Publication Nos. US2010/0252384 to Eisengruber; US2011/0233026 to Pawley; and US2013/0277164 to Prout et al. While the foregoing clutch designs may function effectively to transfer torque in automotive applications, including in powered vehicle drive wheels, they are not sufficiently robust to withstand loads on aircraft landing gear structures during landing and to function effectively and reliably in an aircraft landing gear wheel drive system environment. Moreover, these systems do not provide the kind of failsafe capability that ensures that the clutch will never be engageable during flight, landing, takeoff, or during any other aircraft operating condition when operation of an aircraft landing gear wheel drive system would be unsafe.

A range of aircraft landing gear wheel drive systems that may be used to drive aircraft on the ground without reliance on aircraft main engines has been proposed in the art. U.S. Pat. No. 7,445,178 to McCoskey et al.; U.S. Pat. No. 8,109,463 to Cox et al.; U.S. Pat. No. 8,684,300 to Wilson et al.; and U.S. Patent Application Publication Nos. 2009/0294577 to Roques et al.; 2010/0065678 to Kiyosawa; and 2010/0276535 to Charuel et al. are illustrative of various drive systems intended to move aircraft autonomously on the ground. U.S. Pat. No. 7,469,858 to Edelson; U.S. Pat. No. 7,891,609 to Cox; U.S. Pat. No. 7,975,960 to Cox; and U.S. Pat. No. 8,109,463 to Cox et al., owned in common with the present invention, describe aircraft drive systems that use electric drive motors to power aircraft wheels and move an aircraft on the ground without reliance on aircraft main engines or external vehicles. While the drive motors described in the foregoing patents and published applications may be used to move an aircraft autonomously during ground operations, it is not suggested that torque transfer between the drive motors and the aircraft landing gear wheels driven by the drive motors may be achieved by selective activation of a powered clutch assembly or system that reliably and selectively transfers torque to an powered aircraft drive wheel only when safe operation of the aircraft wheel drive system may be ensured.

A need exists, therefore, for a reliable clutch assembly with the advantages of a selectable one—way clutch that is specifically designed to be an integral component of an aircraft powered landing gear wheel drive system and to selectively and safely transfer torque only when required to drive an aircraft drive wheel and move the aircraft autonomously on the ground and, further, that has a failsafe mechanism activatable to ensure that the powered clutch assembly may not engage the aircraft drive wheel to transfer torque unless the powered landing gear wheel drive system may be operated safely.

SUMMARY OF THE INVENTION

It is a primary object of the present invention, therefore, to provide a reliable clutch assembly with the advantages of a selectable one—way clutch that is specifically designed to be an integral component of an aircraft powered landing gear wheel drive system, that selectively and safely transfers torque only when required to drive an aircraft drive wheel and move the aircraft independently or autonomously on the ground, and, further, that has a failsafe mechanism activatable to ensure that the powered clutch assembly may not engage the aircraft drive wheel to transfer torque unless the landing gear wheel drive system may be operated safely.

It is another object of the present invention to provide a powered clutch assembly for an aircraft ground travel landing gear wheel drive system operatively coupled to landing gear wheel drive system components to automatically and selectively transfer torque to wheel drive system components as required to drive the aircraft autonomously in a desired direction during taxi.

It is an additional object of the present invention to provide a powered clutch assembly for a wheel drive system mounted within an aircraft nose or main landing gear wheel with integrated torque-transferring drive system components designed to fit completely within space available in an aircraft landing gear wheel that is powered to control the transfer of torque through wheel drive system components only when the aircraft may be driven safely on a ground surface.

It is a further object of the present invention to provide an aircraft landing gear wheel drive system with a powered clutch assembly that includes a clutch with selectable one-way capability controlled and powered to reliably engage or disengage a drive motor and transfer torque through wheel drive system components selectively as required to move the aircraft on the ground and/or to ensure that the drive motor is not engaged when the aircraft is in flight, during landing or takeoff, and at other times when the drive motor should not be operational.

It is yet a further object of the present invention to provide a power-actuated locking clutch assembly with selective one-way capability that is electrically actuatable so that the clutch assembly is reliably locked in a desired position to selectively transfer or not transfer torque to a drive motor in an aircraft landing gear wheel drive system.

It is yet an additional object of the present invention to provide a power supply for a powered clutch assembly in an aircraft landing gear wheel drive system integral with drive wheel system structures that is controllable to selectively supply power to powered clutch assembly actuation elements that may engage or disengage drive motor and drive motor activation components to selectively transfer torque in response to predetermined or selected aircraft operating conditions or aircraft environmental conditions.

It is yet another object of the present invention to provide a rotary electric power transfer system to transfer electric power to actuate a powered clutch assembly, as well as to transfer electric power to other wheel-mounted components of an aircraft landing gear drive wheel or a wheel drive system for a aircraft landing gear wheel.

In accordance with the aforesaid objects, the present invention provides a powered clutch assembly useful in an aircraft landing gear wheel drive system with powered electric or other drive wheel motors controllable to move an aircraft independently of aircraft engines or tow vehicles during ground travel. The clutch assembly is powered with a source of electric power transferred through a rotary power transfer system that may be mounted with drive wheel system components within an aircraft landing gear drive wheel. The powered clutch assembly is controllably coupled to the aircraft wheel drive system to selectively transmit torque or not transfer torque to the wheel drive system so that the aircraft drive wheel will be driven only when the aircraft is on the ground and will not be driven when the aircraft is in flight, during landing and takeoff, and at other times during aircraft operation when safety or other considerations dictate that the aircraft drive system should not be engaged. Powered actuation elements or pins are electrically actuated to lock clutch rotating elements when required to selectively transfer torque to drive system components only when the drive system components should be operated to drive the aircraft. This arrangement also improves the reliability of failsafe operation of the clutch assembly and prevents torque transfer to the drive system when torque should not be transferred. The rotary power transfer system, which may include a rotary transformer or the like, may transfer electric power to operate structures associated with the aircraft drive wheel other than the powered clutch assembly.

Other objects and advantages will be apparent from the following description, claims, and drawings.

DESCRIPTION OF THE INVENTION

The benefits of being able to efficiently and safely move an aircraft independently or autonomously during ground operations without reliance on the aircraft's main engines or external tow vehicles have been recognized. Actually achieving these benefits, however, has proved challenging. Applicant's previously proposed aircraft landing gear wheel non-engine drive motors and systems have been demonstrated to effectively power drive wheels and move aircraft on the ground and, thus, can enable aircraft operators to achieve the advantages of autonomous ground movement. The present invention improves the capabilities of Applicant's original aircraft landing gear drive wheel drive systems and expands the advantages possible when aircraft can be driven autonomously during ground operations by controllable non-engine drive motors and systems independently of the aircraft's main engines and external ground vehicles. These advantages and improvements are achieved, in large part, by the design of a powered clutch assembly with an actuation system powered by a wheel-mounted rotary power transfer system to selectively transfer or not transfer torque and control operation of an aircraft landing gear drive system drive motor to actuate or de-actuate the drive motor, as appropriate, so that the drive motor is actuated only when the drive system should be engaged.

Figure 1A:
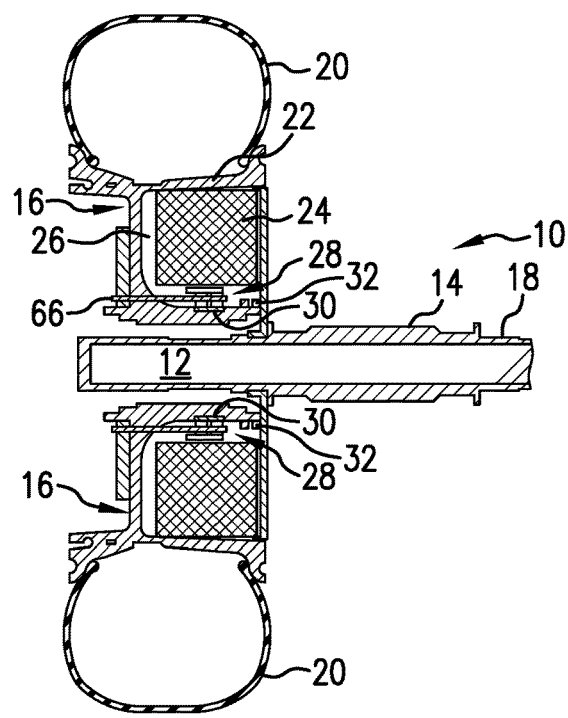
FIG. 1A is a cross-sectional schematic view of a portion of an aircraft landing gear and a landing gear drive wheel in an aircraft landing gear wheel drive system with a powered clutch assembly that shows an electric drive motor engaged by the clutch assembly.
Figure 1B:
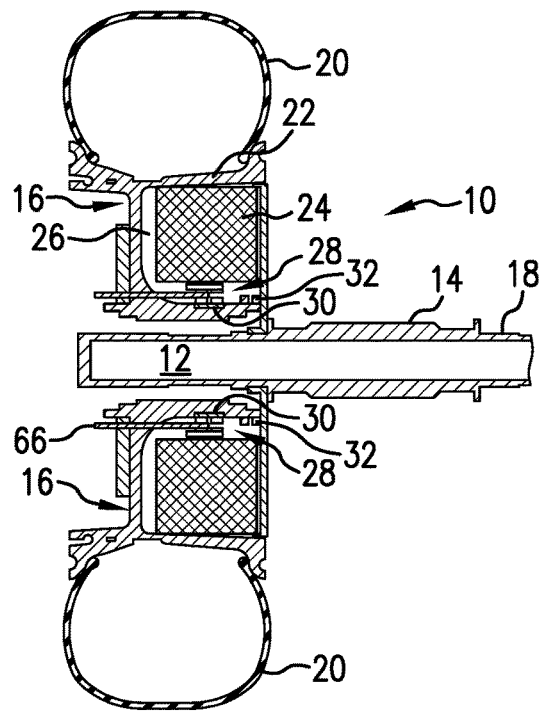
FIG. 1B is a cross-sectional schematic view of a portion of an aircraft landing gear and a landing gear drive wheel in an aircraft landing gear wheel drive system with a powered clutch assembly that shows an electric drive motor disengaged from the clutch assembly.

Referring to the drawings, which are schematic and/or diagrammatic representations and are not drawn to scale, FIGS. 1A and 1B show, respectively, schematic cross-sectional views of a portion of an aircraft landing gear wheel assembly 10, including an axle 12, and indicate the location of a strut 14 that would extend outwardly of the axle 12 to connect landing gear wheels to the body of an aircraft (not shown). While the landing gear wheel assemblies 10 shown may be more typical of nose wheel landing gear assemblies, either or both nose wheel landing gear assemblies or main wheel landing gear assemblies are contemplated as locations for a powered clutch driven aircraft drive system in accordance with the present invention. A single landing gear wheel 16 is shown mounted for rotation on the axle 12. In a typical aircraft nose landing gear assembly, a second wheel (not shown) would also be mounted on the axle 12 on an opposite side of the strut 14 at location 18. Nose landing gears on some aircraft have only a single wheel, and it is contemplated that a single wheel could be adapted to accommodate the present powered clutch and drive wheel components required for autonomous aircraft ground movement. Larger numbers of wheels may be mounted on multiple axles in aircraft main landing gear assemblies. A tire 20 is mounted on a tire-supporting section 22 of the wheel 16.

Although not shown in detail in FIGS. 1A and 1B, a drive motor and drive motor activating system, represented by the block 24, may be mounted completely within the wheel 16, within in an interior volume 26 defined by the configuration of the wheel wall structures. In an electric drive wheel drive system, the drive motor may be an electric drive motor. In another drive system, for example a hydraulic or pneumatic drive system, the drive motor may be a hydraulic drive motor system or pneumatic drive motor system, or any other suitable type of drive motor that may be configured to fit within the wheel volume 26. The powered clutch assembly described herein may be adapted or modified to function as described herein with different types of drive motors and drive systems. A preferred electric drive motor may include at least a rotor and a stator and may be capable of operating at speeds that will generate sufficient torque to drive aircraft of a range of different sizes during ground travel. A range of electric motor designs capable of high torque operation across a desired speed range that can drive an aircraft wheel to move an aircraft on the ground and function as described herein are contemplated to be within the scope of the present invention. For example, without limitation, a high phase order electric motor of the kind described in commonly owned U.S. Pat. Nos. 6,657,334; 6,838,791; and 7,116,019, the disclosures of the aforementioned patents being fully incorporated herein by reference, may be effectively used with the present invention. Other functionally equivalent electric motors may also be used.

A drive motor activating system (not shown) useful with an electric drive motor and the powered clutch assembly of the present invention may be a gear system that includes, for example without limitation, an arrangement of planetary and sun gears in torque transfer relationship with the powered clutch of the present invention, a roller traction drive system, or any other suitable drive motor activating system that may operate with a powered clutch assembly as described herein when torque is transferred to the drive motor activating system to activate or de-activate a drive motor in an aircraft landing gear drive wheel. As noted above, both the drive motor and the drive motor activating system should be sized to fit within the volume 26 defined within the wheel 16.

A powered clutch assembly 28 in accordance with the present invention may be activated automatically or manually to selectively transfer torque through the drive motor activating system to the drive motor to engage the drive motor to move an aircraft drive wheel to drive the aircraft in a desired ground direction at a desired speed or a torque associated with a desired speed or, when appropriate, to disengage the drive motor so that it is unable to drive the aircraft drive wheel. The drive motor should only be engaged by the powered clutch assembly when the aircraft is actually on the ground, such as after landing and prior to takeoff, and when the aircraft is traveling at a desired speed during ground travel. Engagement and disengagement of the drive motor by the powered clutch assembly 28 could be targeted, for example, to the speed of the aircraft wheel 16 and/or to speeds of drive wheel system components, for example the speed of the drive motor, the speed of a drive motor rotor, and/or the speed of the drive motor activating system rotating components. Drive motor engagement and disengagement may also be targeted to predetermined environmental or other conditions. A selectable one-way clutch that can be selectively engaged in a forward and or a reverse rotational direction and that has a failsafe overrunning capability may be adapted for use in the powered clutch assembly of the present invention.

The powered clutch assembly 28 may advantageously be located within the defined volume 26 within the wheel 16 in torque transfer communication with the drive motor and the drive motor activating system interiorly of a wheel section 30 adjacent to the axle 12, as shown in the drawings. However, other locations within an aircraft wheel may be more appropriate in some wheel drive system configurations and are also contemplated to be within the scope of the present invention. Power for the powered clutch assembly of the present invention may be transferred by a rotary power transfer element that may be connected to a supply of aircraft electric power, such as a rotary transformer 32 or another rotary power transfer element. This arrangement may be seen more clearly in FIGS. 2-4 and is discussed in greater detail below.

Although a range of different types of clutches capable of automatically and selectively transferring torque is described in the art, they have been designed to drive automotive automatic transmissions, which present very different design and operating conditions from those presented in an aircraft wheel drive system intended to move a range of different sizes and types of aircraft on ground surfaces. The available clutch designs may not have the robustness and reliability required to function to effectively transfer or not transfer torque as required in an aircraft landing gear wheel drive system environment.

One type of clutch assembly that may be adapted for use in the powered clutch driven aircraft wheel drive system described herein is a clutch assembly that incorporates features of both a one-way clutch and a selectable or controlled one-way clutch in a single clutch assembly that may be engaged selectively in one or both directions and has a failsafe overrunning capability to ensure that the clutch may not engage the drive system to drive the aircraft wheel during flight, landing, takeoff, or during other situations when operation of the drive system would not be safe. Commonly owned co-pending application Ser. No. 14/611,100, filed 30 Jan. 2015, the disclosure of which is fully incorporated herein by reference, describes a selectable one-way clutch that may be adapted for use with the present invention as described below. The locking elements currently provided for selectable one-way clutches may include a number of circumferentially spaced rockers, struts, or similar movable locking elements on one clutch element that engage corresponding windows or pockets in another clutch element. The locking elements may be configured to selectively hold torque in a selected forward and/or reverse rotational direction to establish different clutch operating modes. Such clutches, particularly those disclosed in U.S. Pat. No. 8,079,453 to Kimes and in U.S. Patent Application Publication Nos. US2010/0252384 to Eisengruber; US2011/0233026 to Pawley; and US2013/0277164 to Prout et al.

cited in the Background of the Invention above, have been proposed for use in automobiles. The disclosures of these patents and published patent applications are incorporated herein by reference. Automobile drive systems, however, are not subject to the loads and stresses typically encountered in an aircraft landing gear wheel drive system, and the aforementioned locking elements may not reliably allow or prevent torque transfer in an aircraft landing gear wheel application, particularly when subjected to the vibrations and shocks that accompany aircraft landings. The powered clutch assembly of the present invention improves this type of clutch system to overcome these and other challenges.

Figure 2:
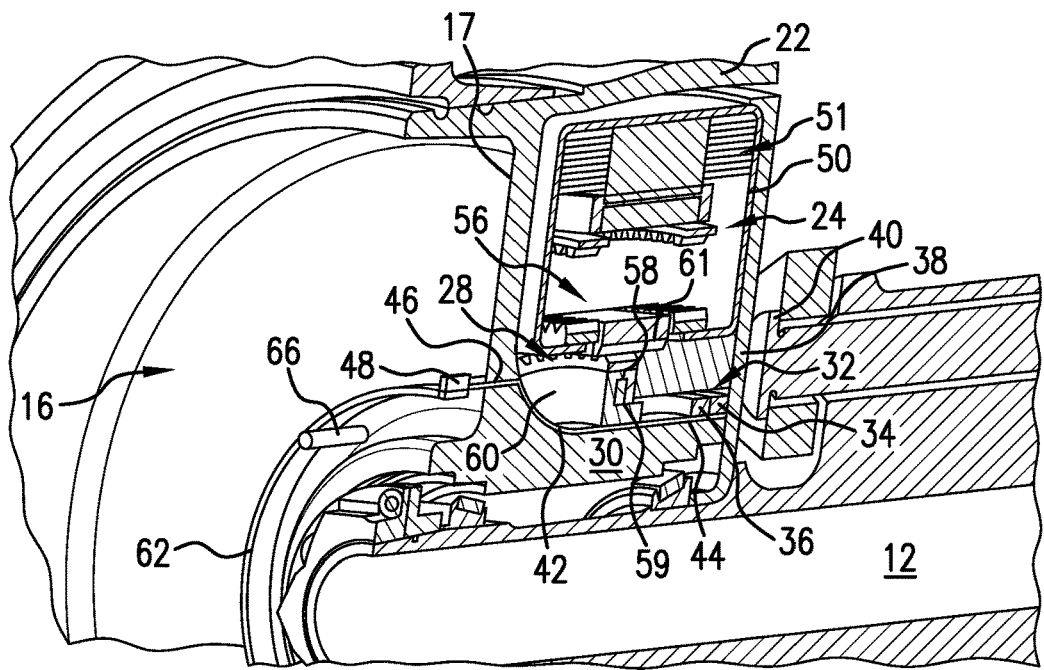
FIG. 2 is a schematic perspective view of a portion of the powered clutch assembly of the present invention in an aircraft landing gear drive wheel showing a rotary power transfer system and actuator assembly.
Figure 3:
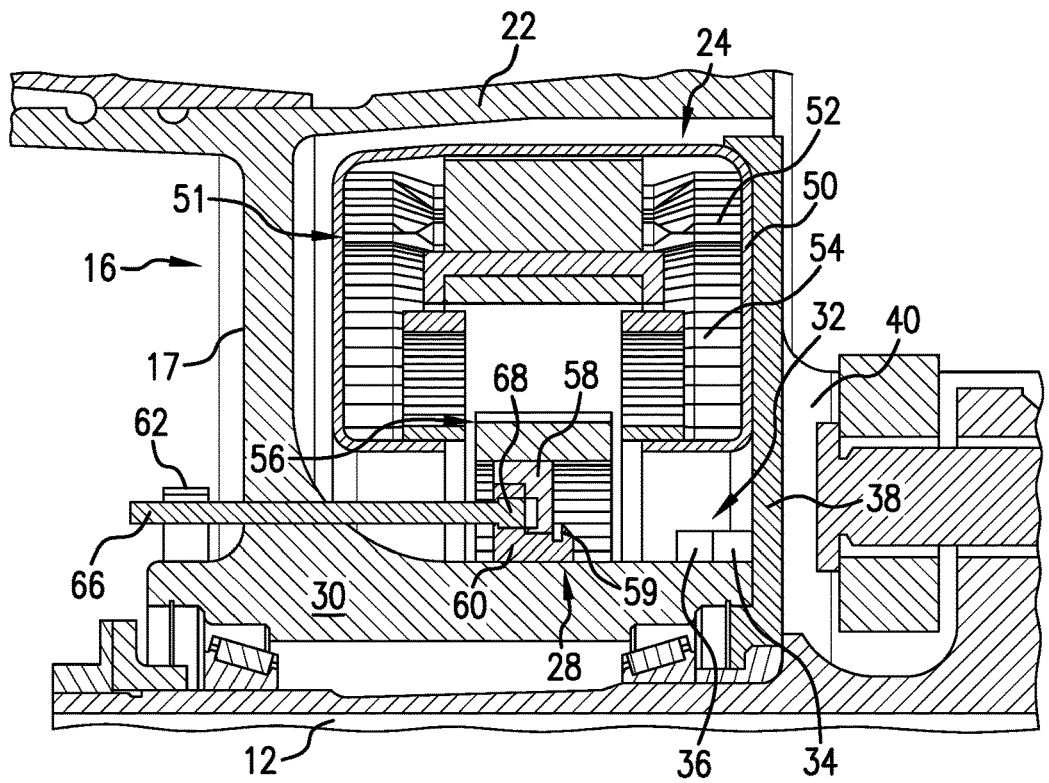
FIG. 3 is a schematic front cross-sectional view of a portion of the powered clutch assembly of the present invention in an aircraft landing gear drive wheel showing the actuator elements and torque transfer components of the system.
Figure 4:
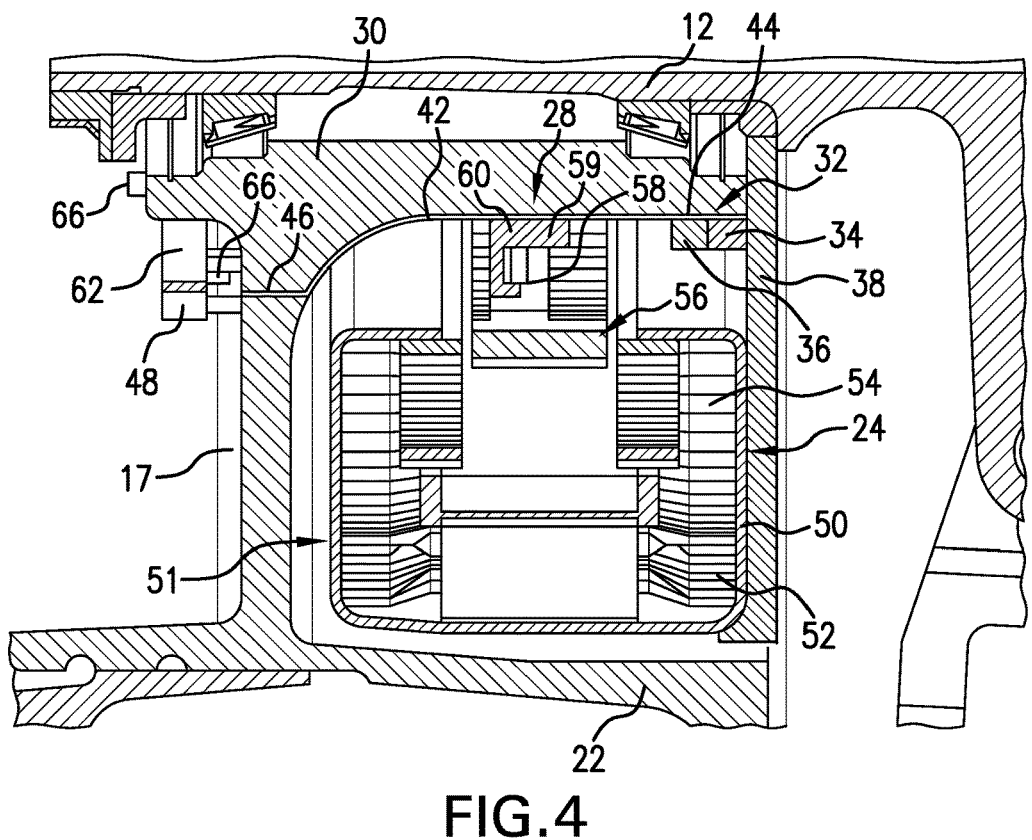
FIG. 4 is a schematic front cross-sectional view of a portion of the powered clutch assembly of the present invention in an aircraft landing gear drive wheel showing components of the rotary power transfer system and an actuator element.

FIGS. 2-4 illustrate the powered clutch driven aircraft landing gear wheel drive system of the present invention in more detail. Portions of the landing gear wheel and other landing gear structures shown and described in connection with FIGS. 1A and 1B are identified with same reference numbers used in FIGS. 1A and 1B. In FIG. 2, the drive system appears schematically in cross-section from a perspective that shows the wheel 16 supported on the axle 12 and the drive system components within the volume 26 defined by the wheel 16. FIGS. 3 and 4 illustrate schematic front cross-sectional views of an aircraft landing gear wheel 16 with the powered clutch assembly and the wheel drive system of the powered clutch driven aircraft landing gear wheel drive system of the present invention as it appears on opposite sides of the axle 12.

The powered clutch assembly 28 of the present invention is powered by electric power that may be transferred to the clutch assembly from an aircraft supply of electric power by a rotary power transfer assembly, such as the rotary transformer 32. The rotary transformer 32 embodiment shown may include a stationary element 34 and a rotary element 36. The stationary element 34 may be attached to a stationary or non-rotating section 38 of the wheel 16, which may then be attached to a torque take out structure 40 that may preferably be in an inboard location of the landing gear. The rotary element 36 rotates or spins with the wheel 16 to transfer power for clutch actuation through a wire 42 that may be positioned in a trench 44 in the wheel section 30. The wire 42 preferably exits the wheel through a channel 46 to connect with one or more clutch actuator motors 48 on an exterior face of the wheel 16, which may be seen more clearly in FIG. 5. Electric power transfer to power clutch actuation elements may also be produced by and/or obtained from other rotary power transfer elements or assemblies, for example without limitation, slip rings and the like. Any rotating power transfer component connected between a stationary landing gear component and a landing gear wheel rotating component may be used in a power transfer system to transfer electric power to clutch actuation elements as described herein and is contemplated to be within the scope of the present invention.

One embodiment of a drive motor and drive motor activating system is shown in FIGS. 2-4. This drive motor and drive motor activating system may be enclosed within a housing 50 that may be secured to the wheel non-rotating or static wall 38. A preferred electric drive motor 24 may have an arrangement of one or more stators 52 and rotors 54 as shown in FIGS. 3 and 4, although electric drive motors with other configurations and arrangements of stationary stator elements and rotating rotor elements are contemplated to be within the scope of the present invention. A drive motor activation system 56, which, as indicated above, may be a system of gearing or a roller traction drive system, or any other suitable drive motor activating system, is located within the housing 50 and may be positioned to activate the drive motor 24 and transfer torque as required to operate the drive motor and drive the aircraft wheel on the ground. Electric power for an electric drive motor, such as the drive motor 24, may also be supplied by a wire harness or the like (not shown) connected to a supply of electric power, such as the aircraft's auxiliary power unit, on the aircraft.

Figure 6A:
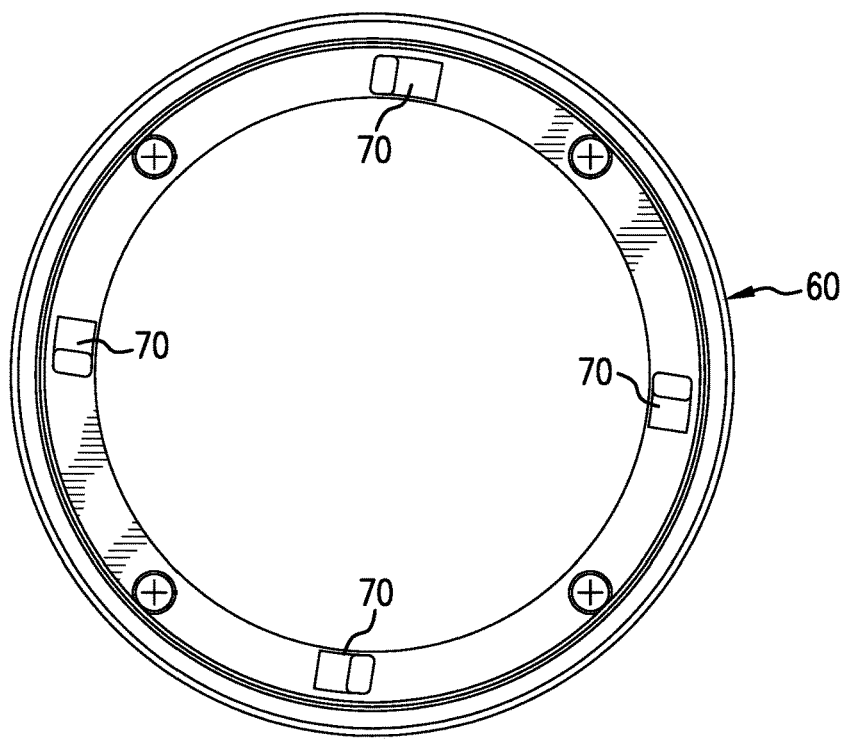
FIG. 6A is a schematic front view of one embodiment of a clutch notch plate element useful in the powered clutch assembly of the present invention.
Figure 6B:
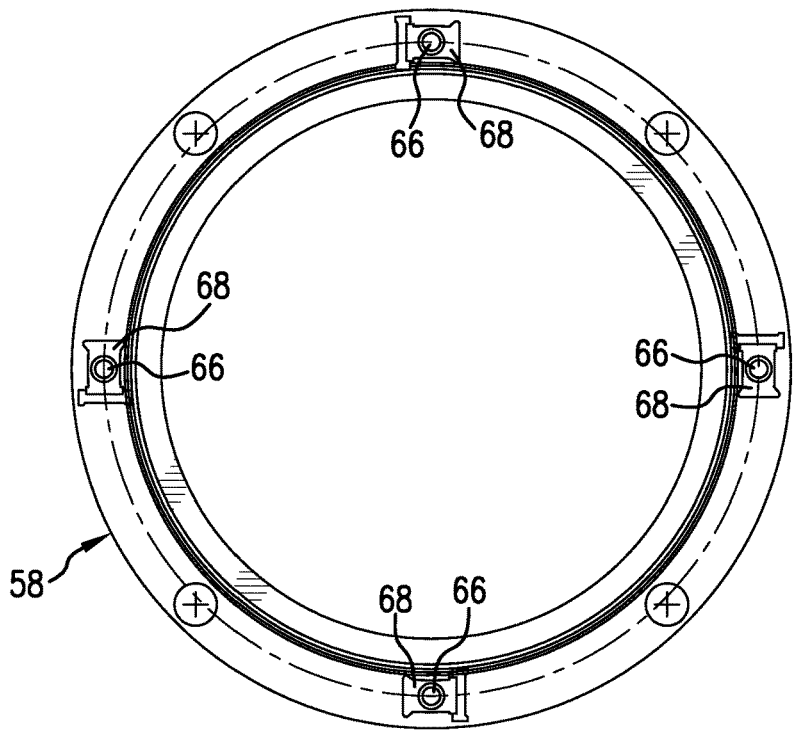
FIG. 6B is a schematic front view of one embodiment of a clutch pocket plate element useful in the powered clutch assembly of the present invention

The powered clutch assembly 28, which may be connected to the drive motor activation system 56 and the drive motor 24, includes at least a pocket plate 58 and a notch plate 60, which are shown in front view in FIGS. 6A and 6B. The pocket plate 58 and structures mounted on the pocket plate may rotate with the wheel 16, while the notch plate may be attached to the drive motor activation system 56. A retaining ring 59 may be provided to hold the pocket plate 58 and notch plate 60 in desired relative positions. A spline 61 may additionally be provided on the wheel housing 50 or other wheel structure adjacent to the clutch assembly to engage a correspondingly configured surface on the pocket plate 58 to pass torque from the pocket plate to the wheel, as shown in FIG. 2, when the powered clutch assembly 28 is engaged to transfer torque. Alternatively, any functionally equivalent mechanical locking element that could be positioned in selective meshing engagement between the powered clutch assembly 28 and other wheel torque transfer structures may be used in place of a spline. A range of mechanical connection elements, including without limitation, keyed elements, lock rings, and the like, may be used to transfer torque from the clutch assembly pocket plate 58 to the wheel housing 50 or other wheel structure.

One available clutch assembly, referred to above and intended for automotive and like vehicle applications, uses an arrangement of a pocket plate, usually with a number of circumferentially spaced spring biased struts or locking elements that pivot into and out of engagement with corresponding receptacles or notches on a notch plate to prevent or allow torque transmission in a selected rotational direction. As noted above, while this arrangement may function effectively in an automotive environment, the spring biased locking elements may not be sufficiently robust to withstand the stresses and forces to which aircraft landing gears and landing gear wheels are subjected, particularly during landing, to reliably selectively control torque transfer as required to ensure engagement and activation of an aircraft drive system, such as that described and shown herein, only when such engagement or activation would be safe. Such a clutch arrangement may not reliably prevent engagement and activation to transfer or not transfer torque when the aircraft drive system should not be activated or engaged, including when the aircraft is in flight and during landing and takeoff, as well as at any other time when operation of the aircraft landing gear drive wheel drive system could adversely affect safe operation of the aircraft. The powered clutch assembly of the present invention has been specifically designed with components that function effectively in an aircraft landing gear drive wheel to reliably and controllably transfer torque only when the aircraft drive wheel system should be activated or engaged.

Figure 5:
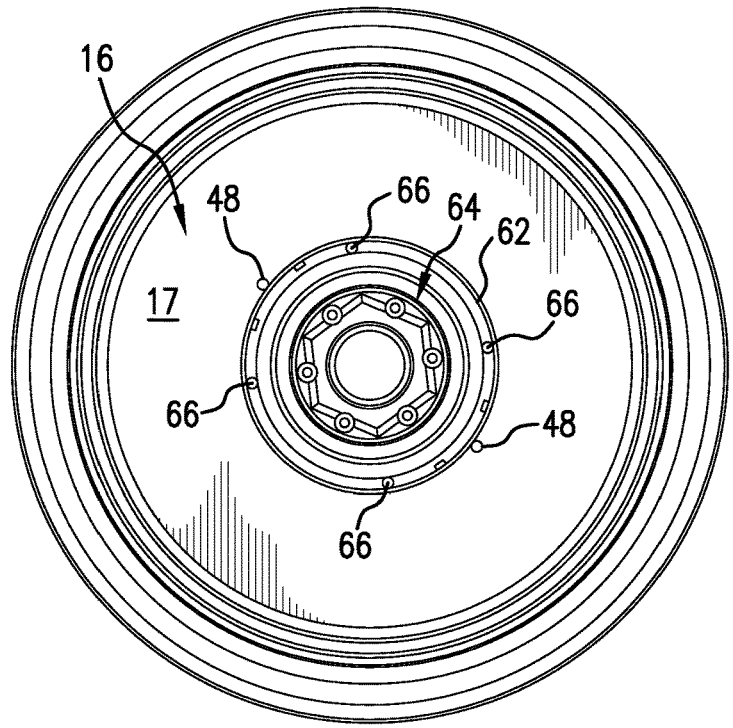
FIG. 5 is a front view of a portion of an aircraft landing gear wheel hub and cover showing components of the powered clutch power supply and transfer system and actuator elements.

As described above, the rotary transformer 32, or other rotary power transfer element, which may connect the stationary wheel wall 38 or another stationary landing gear structure to a rotating landing gear wheel structure, transfers power from the aircraft source of electric power (not shown), typically through wires or the like, to the clutch assembly components and/or other wheel components to be powered. This power may be transferred to one or more clutch actuator motors 48 through wires, like the wire 42 shown in FIGS. 2 and 4, that electrically connect the rotary transformer 32 with one or more clutch actuator motors 48 to transfer power to the clutch actuator motors 48. The one or more clutch actuator motors may drive a ring gear 62 that may be exterior to the wheel 16 outboard exterior face 17. The ring gear 62 may be concentric with the wheel hub 64 and located radially outwardly of the wheel hub 64 a distance that accommodates actuation elements 66 located as described below. A preferred embodiment of a clutch actuator motor is sized to fit outboard of the wheel 16 as shown in the drawings. The clutch actuator motor may be small in size because the only resistance that may be encountered by the motor is air resistance as the wheel 16 rotates. Two clutch actuator motors 48 located in diametrically opposed positions outwardly of a drive wheel hub 64 are shown in FIG. 5. Other numbers and arrangements of clutch actuator motors may also be used to power a clutch assembly on a drive wheel. Although not shown, it is contemplated that a protective wheel hub cover may be positioned over the wheel 16 outboard exterior face 17. Such wheel hub covers are available for use on aircraft wheels.

The powered clutch 28 of the present invention employs a combination of a pocket plate 58 and a notch plate 60 that may be activated by a locking arrangement that employs actuation elements or actuation pins 66 spaced circumferentially with respect to the wheel hub 64. Each actuation element 66 may be formed with a head 68 that has a larger diameter than the remainder of the actuation element to have a "hammerhead" configuration. The actuation elements 66 may be mounted in the wheel as shown in FIGS. 1A, 1B, and 3 to extend from the wheel 16 outboard exterior face 17 through the wheel so that the head 68 engages the clutch 28. The actuation elements are activated by power transferred from the rotary transformer, or a slip ring or like rotary power transfer structure, to the clutch actuator motors 48 and the ring gear 62 from an outboard side of the wheel to lock both the pocket plate 60 and the notch plate 58 when the actuation elements 66 are powered and driven in an inboard direction to engage both clutch plates. This approach eliminates the need for the struts typically used to lock a pocket plate and a notch plate in this type of clutch. The foregoing arrangement, moreover, is significantly more reliable in an aircraft landing gear environment than in an automotive environment and is able to withstand shocks and vibration that accompany landing with more reliable failure modes. Four actuation elements 66 are shown spaced equidistantly radially outwardly of the wheel hub 64 in FIGS. 5 and 6B. The configuration of the "hammerhead" end 68 of the actuation elements 66 is shown in cross-section on the pocket plate 58 in FIG. 6B. Correspondingly shaped receptacles 70 in the notch plate 60 maybe provided to receive the "hammerhead" end 68 when the actuation pins 66 are powered by the clutch actuation motors and driven into engagement with the notch plate to engage the drive motor activation system 56 and the drive motor 51. The position of one of the actuation elements 66 when the drive motor and drive motor activation system are engaged is shown in FIG. 1A. Both the pocket plate 58 and the notch plate 60 are locked together in a manner that may withstand vibrations, shocks, and other stresses which may be exerted on aircraft landing gear components while effectively transferring torque through the wheel drive system to move the aircraft in forward or reverse on the ground.

The disengaged position of the actuation element 66, in which the pocket plate 58 and the notch plate 60 are not locked together and torque is not transferred through the wheel drive system components is shown in FIG. 1B. Power is not transferred by the rotary transformer 32 through the clutch actuator motors 48 and ring gear 62 to the clutch actuation elements 66 in this disengaged condition. Control of the rotary transformer to stop the transfer of power is preferably automatic, but may also be manual. It is contemplated that suitable automatic control electronics and processors will be provided to automatically control power transfer from the rotary transformer 38 to the clutch actuator motors 48. It is also contemplated that a suitable pilot-activated manual control element in communication with the rotary transformer control electronics may be provided in an aircraft's cockpit control array.

Providing four spaced actuation elements 66 associated with the pocket plate 58 and four receptacles 70 in the notch plate 60 as shown may facilitate alignment of the actuation elements 66, pocket plate 58, and notch plate 60 when the actuation elements are powered to lock the pocket plate and notch plate and engage the drive motor activation system 56 and the drive motor 24. Backlash is not an issue with the powered clutch arrangement described herein, and alignment of the powered clutch components may be achieved without sensors. The use of one or more "dummy" actuation elements that are not powered may be suitable in some powered clutch applications and is contemplated to be within the scope of the present invention. Additionally, transferring power to only one of the clutch actuator motors or to a number less than the full complement of clutch actuation motors may be more effective in some applications, and this is also contemplated to be within the scope of the present invention.

The transfer of electric power to rotating aircraft landing gear structures by a rotary transformer connected to a landing gear wheel stationary structure may be used for purposes other than powering clutch actuation elements as described above. Power could be transferred to any other rotating aircraft wheel components that require a source of electric power, for example without limitation, to sensors and lights. Control electronics may be adapted to send power to several different wheel components in addition to, or instead of, clutch actuating elements. The structure of the rotary transformer could also be modified to transfer power to more than one location. As noted above, the rotary transformer could be replace by a slip ring or like rotary power transfer element. Other variations of the rotary transformer power transfer system of the present invention are also contemplated be within its scope.

It is preferred that the components of the powered clutch assembly of the present invention be designed to withstand high torque loads, preferably torque loads in excess of a determined maximum torque load for an aircraft drive wheel drive system and made of materials suitable for effective long term operation in the environmental conditions likely to be encountered in aircraft landing gear wheels.

While the rotary power transfer system described herein may be most advantageously used in aircraft landing gear drive wheels, this system may also be used to transfer electric power in other vehicles that are driven by powered drive wheels and have drive systems for the powered drive wheels with electric motors that are activated by clutch-actuated drive systems. Other applications of this rotary power transfer system are also contemplated to be within the scope of the present invention.

While the present invention has been described with respect to preferred embodiments, this is not intended to be limiting, and other equivalent arrangements and structures that perform the required functions are contemplated to be within the scope of the present invention.

INDUSTRIAL APPLICABILITY

The powered clutch assembly and the rotary transformer power generation and transfer system of the present invention will find their primary applicability in aircraft landing gear wheel drive systems to reliably and effectively transfer torque and power to components of aircraft landing gear wheel drive systems as aircraft are driven autonomously without aircraft engines or tow vehicles during ground travel by the operation of the landing gear wheel drive systems.

The invention claimed is:

1. A powered clutch assembly electrically actuatable to control operation of a drive motor in an aircraft landing gear wheel drive system to drive the aircraft only when the aircraft should be driven during taxi on a ground surface, comprising:
   a. an aircraft landing gear wheel drive assembly mounted completely within an interior volume defined by wheel wall structures of an aircraft landing gear wheel, said wheel drive assembly comprising at least a drive motor, a drive motor activating system, and an electrically actuatable powered clutch assembly located within said defined interior volume in torque transfer engagement and disengagement with said drive motor;
   b. said electrically actuatable powered clutch assembly being in selective torque transfer contact with said drive motor and comprising at least one or more clutch actuator motors, a ring gear driven by said one or more clutch actuator motors, a pair of clutch plates, and powered actuation elements driven by said ring gear to engage and lock or to release said pair of clutch plates; and
   c. an electric power supply system for said electrically actuatable powered clutch assembly comprising at least a source of electric power on said aircraft and a rotary power transfer element connecting a stationary landing gear wheel structure to a rotating landing gear wheel structure, said rotary power transfer element connecting said source of electric power to said one or more clutch actuator motors and to said powered actuation elements in said electrically actuatable clutch assembly.

2. The assembly of claim 1, wherein said rotary power transfer element comprises a rotary transformer comprising a stationary portion attached to a static portion of said aircraft landing gear wheel and a rotating portion that rotates when said aircraft landing gear wheel rotates.

3. The assembly of claim 1, wherein said one or more clutch actuator motors are mounted on an outboard face of said aircraft landing gear wheel in driving contact with said ring gear, and one or more wires connect said one or more actuator motors to said rotary power transfer element.

4. The assembly of claim 1, wherein each of said powered actuation elements comprises an actuation pin with a uniformly cylindrical body section integrally formed with a hammer-shaped actuating head section configured to engage and lock both said clutch plates.

5. The assembly of claim 4, wherein said powered actuation elements are positioned with the cylindrical body section outboard of said wheel to receive electric power from said ring gear in contact with said one or more clutch actuator motors and with the hammer-shaped actuating head section in or out of engaging and locking contact with both said clutch plates.

6. The assembly of claim 5, wherein each of said pair of clutch plates comprise powered actuation element engagement and locking receptacles for each said powered actuation element having a cross-sectional configuration corresponding to a cross-sectional configuration of said hammer-shaped actuating head section.

7. The assembly of claim 1, wherein a housing section of said aircraft landing gear wheel comprises a mechanical locking element positioned in selective meshing engagement with one of said pair of clutch plates.

8. The assembly of claim 7, wherein said mechanical locking element comprises a spline element, a key element, or a lock ring element.

9. The assembly of claim 1, wherein said drive motor activation system comprises a gear system or a roller traction drive system in torque transfer contact with said drive motor.

10. The assembly of claim 1, further comprising automatic or manual control means for controlling and directing a supply of electric power from said source of electric power on said aircraft to said rotary power transfer element.

11. The assembly of claim 3, further comprising four spaced clutch actuator motors mounted on said outboard face of said aircraft landing gear wheel and connected by said one or more wires to said rotary power transfer element in driving contact with said ring gear.

12. A method for controlling actuation of a powered clutch assembly electrically actuatable to control operation of a drive motor in an aircraft landing gear wheel drive system to drive the aircraft only when the aircraft should be driven during taxi on a ground surface, comprising:
   a. providing an aircraft landing gear wheel drive assembly comprising at least a drive motor, a drive motor activating system, and an electrically actuatable clutch assembly in selective torque transfer contact with the drive motor and mounting the landing gear wheel drive assembly completely within an interior volume defined by wheel wall structures of an aircraft landing gear wheel;
   b. providing an electrically actuatable powered clutch assembly comprising at least one or more clutch actuator motors, a ring gear driven by the one or more clutch actuator motors, a pair of clutch plates, and powered actuation elements driven by the ring gear to selectively engage and lock the pair of clutch plates and an electric power supply system to direct power to the clutch actuator motors and the powered actuation elements from a source of electric power on the aircraft through a rotary power transfer element;
   c. while the aircraft is driven during taxi on a ground surface, directing electric power from the aircraft source of electric power through the rotary power transfer element to the one or more clutch actuator motors, and transferring power from the clutch actuator motors to the powered actuation elements and causing the powered actuation elements to move in an inboard direction to engage and lock the pair of clutch plates and the powered clutch assembly into torque transfer contact with the drive motor; and
   d. when the aircraft should not be driven during taxi on the ground surface or the drive motor should not be operated, automatically or manually stopping transfer of electric power to the powered actuation elements, causing the powered actuation elements to be depowered and to move in an outboard direction out of engagement with the clutch plates, and releasing the pair of clutch plates and the powered clutch assembly from torque transfer contact with the drive motor.

13. The method of claim 12, further comprising providing a plurality of clutch actuator motors and a plurality of powered actuation elements in actuating contact with the clutch actuating motors, transferring electric power to the plurality of clutch actuator motors in actuating contact with the plurality of powered actuation elements, and driving the plurality of powered actuation elements from the outboard to the inboard direction into locking engagement with the pair of clutch plates and the clutch assembly into torque transfer contact with the drive motor.

14. The method of claim 12, further comprising transferring electric power from the supply of electric power through the rotary power transfer element to components other than the clutch assembly comprising at least sensors and lights mounted on the aircraft landing gear wheel that require electric power for operation.

\* \* \* \* \*